United States Patent [19]

Wray et al.

[11] Patent Number: 4,468,637
[45] Date of Patent: Aug. 28, 1984

[54] SYNCHRONIZABLE OSCILLATOR

[75] Inventors: William R. Wray, Sudbury; James Burkhardt, Watertown, both of Mass.

[73] Assignee: Polaroid Corporation, Cambridge, Mass.

[21] Appl. No.: 296,351

[22] Filed: Aug. 26, 1981

Related U.S. Application Data

[62] Division of Ser. No. 166,101, Jul. 7, 1980, Pat. No. 4,307,946.

[51] Int. Cl.³ .............................................. H03K 3/023
[52] U.S. Cl. .................................... 331/143; 331/153; 331/172
[58] Field of Search .................. 331/111, 108 D, 145, 331/149, 153, 143, 172, 173, 53

[56] References Cited

PUBLICATIONS

Graeme, *Applications of Operational Amplifiers*, 1973, pp. 154–165.

Primary Examiner—Siegfried H. Grimm
Attorney, Agent, or Firm—David R. Thornton

[57] ABSTRACT

An oscillator unit having a charge storage device periodically rapidly charged through a small resistor and slowly discharged through a large resistor under control of a comparator for producing an oscillatory output and a switch actuatable by means of a frequency controlled zero-crossing multiplier to selectively discharge the storage device and thereby repeatedly resynchronize the oscillator unit with the frequency input to the multiplier.

2 Claims, 9 Drawing Figures 4,468,637

SYNCHRONIZABLE OSCILLATOR

This is a division of application Ser. No. 166,101, filed on July 7, 1980, now U.S. Pat. No. 4,307,946.

BACKGROUND OF THE INVENTION

This invention relates to a tape drive and control means for sound motion picture systems, and more particularly, to a system for reducing flutter in sound reproduction from a magnetic tape.

For sound accompaniment to motion picture systems, it has been found useful to interleave a magnetic tape with the photographic film so that synchronization can be achieved between the sequential frames of a scene and audio information associated with the scene. In such case, the film drive motor of the system is designed to unspool the interleaved film and tape from a supply reel. Film and tape are directed along separate paths before combining them in interleaved fashion on a takeup reel. A separate capstan motor is employed for driving a capstan engaged with the tape whereby the latter is moved past a transducer which reproduces the sound recorded on the tape.

In motion picture systems, good fidelity in the reproduced sound requires isolation of the intermittent motion of the film from the continuous movement of the tape required for reproducing sound recorded thereon. Such isolation is achieved by creating and maintaining a loop in the magnetic tape of predetermined minimum size. In conventional systems, the rate of the film drive motor is generally varied to maintain this loop. However, the provision of a sound system as an accessory to an existing projection system generally requires that the speed of the sound capstan be varied rather than the film drive. The control system for the capstan, therefore, must relate the speed of the capstan motor to the speed of the film motor such that the loop is maintained within selected limits at all times. Where the sound system is an accessory, this requirement for maintaining the size of the loop is difficult to meet since the film drive motor is not accessible and each motor must operate independently of the other.

In addition to there being a need to establish and maintain a loop in the magnetic tape, short duration accelerations in the tape movement must be minimized to prevent introduction of flutter (i.e., easily noticed and undesirable pitch changes) in the reproduced audio signal.

U.S. Pat. Nos. 3,832,045; 3,838,447 and 3,850,513 describe flutter control systems in which sample portions of information recorded with a reference signal are read from the tape into a memory at a rate determined by a reference signal and then read from the memory at a fixed rate to thereby reduce flutter. Optionally, a speed control for the tape drive is employed to eliminate low frequency errors. While the above-noted flutter control systems operate satisfactorily in many sound systems, they have no provision for maintaining an adequate tape loop independently of slow variations in the speed of the film drive motor.

It is therefore an object of the present invention to provide a new and improved flutter control system for sound reproduction, and an improved sound motion picture system wherein the control system for the capstan motor changes its speed in such a way as to minimize flutter while at the same time maintaining the necessary loop in the tape independently of the film drive motor.

SUMMARY OF THE INVENTION

In the present invention, a synchronizable oscillator circuit is provided having an oscillator unit with a charge storage device automatically periodically charged and discharged to produce an oscillatory output waveform, and a switching means actuatable for selectively discharging said charge storage device so as to synchronize the output waveform of the oscillator unit in accordance with switch actuation. Preferably, the oscillator unit includes a comparator having a capacitor connected from the inverting input of the comparator to ground and the switching means is a normally open switch connected across the capacitor and driven by a zero-crossing multiplier operating at approximately one-half the frequency of the oscillator unit to continuously resynchronize the unit.

The oscillator of the present invention is utilized in a magnetic tape sound system in which flutter in the audio signal recorded on the tape is reduced in accordance with the noted patents by sampling the audio at a rate determined by the frequency of a reference signal also recorded on the tape, reading the samples into respective cells of a memory, and reading out respective cells of the memory at a rate that is independent of rapidly changing, short duration variations in tape speed.

In the noted patents, changes in the delay between read-in and read-out of samples generate an error signal that is used to control the speed of the capstan motor. Short duration accelerations in the tape that would normally introduce flutter into the reproduced audio are compensated for by shifts in the location of the sample being read into the memory relative to the location of the sample being read from the memory. Basically, the rate at which samples are read from the memory is fixed, thereby reducing flutter to an insignificant level, while the rate at which the samples are read into the memory fluctuates with changes in tape speed.

In contrast to the noted patents, the system includes a voltage controlled oscillator to determine a variable read-out rate. Hence, in this arrangement, samples are read out of the memory at a frequency determined by the voltage controlled oscillator whose frequency is initially set during "start-up" (an initialization mode, to be explained in detail below) to the average frequency (or multiple of the frequency) of the reference signal. Once the loop of tape is formed, the oscillator frequency is slowly varied, as needed, by a signal derived from a tape loop sensor. Consequently, during this "run" mode of operation, the frequency of the oscillator remains fixed as long as the loop in the tape is within predetermined limits. Changes in tape speed affect the read-in versus read-out rate and produce an error signal in the flutter control which, in turn, changes the capstan motor speed to a value that reduces the error. If the latter alters the loop size sufficiently, or if the speed of the film drive motor changes, thereby also modifying the loop size, the loop sensor changes the frequency of the oscillator. This alters the read-out rate, which ultimately results in an error signal, thereby changing the speed of the capstan motor to reestablish the loop. Thus, in the run mode, the loop sensor controls the oscillator frequency or read-out rate and the memory system, in turn, controls the tape drive motor. Hence, over the short term the tape drive motor responds to error signal variations, as described in the above referenced patents, and over the long term to the film motor speed

BRIEF DESCRIPTION OF THE DRAWINGS

An embodiment of the present invention is shown in the accompanying drawings wherein:

FIG. 3 is a block diagram of the tape drive and control means of the present invention showing a first or "start-up" circuit configuration which is effective when the tape drive and control means are initially switched on;

DESCRIPTION OF THE PREFERRED EMBODIMENT

Figure 1:
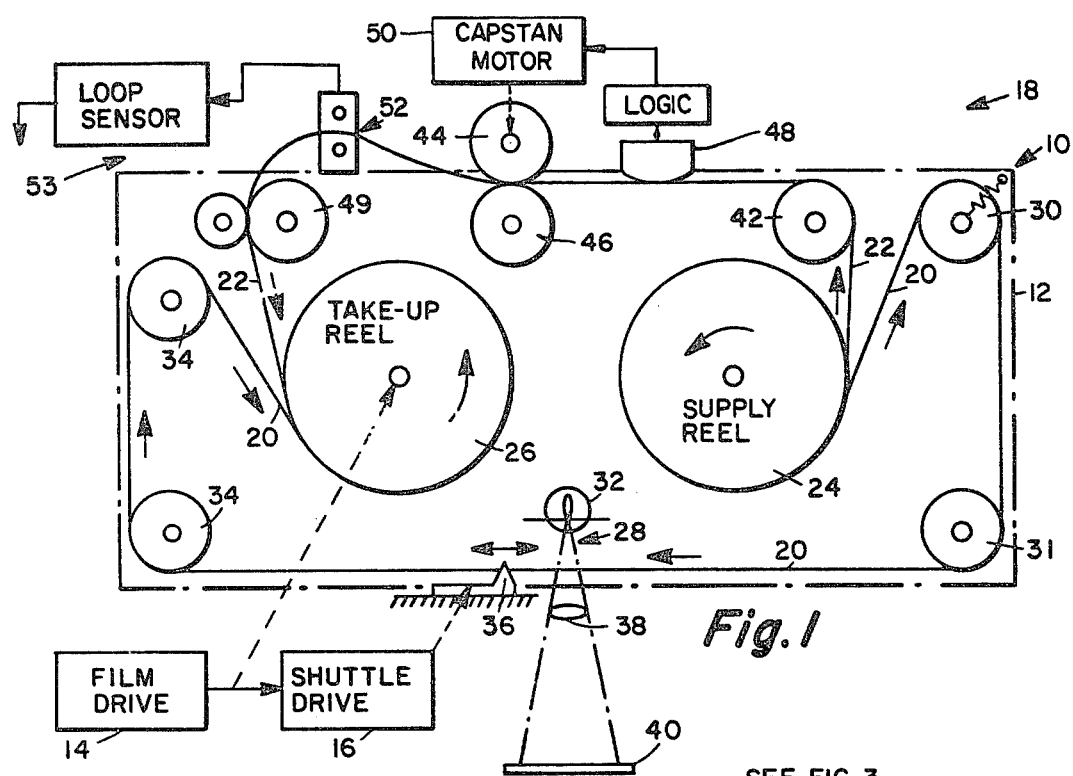
FIG. 1 is a schematic block diagram of a film cartridge and interface portions of a motion picture system in accordance with the invention.

Referring now to FIG. 1, reference numeral 10 designates a portion of a motion picture system of the type described in the form of a cassette 12 operatively associated with a film drive motor 14 and shuttle drive mechanism 16 of the motion picture projector (not otherwise shown) which are operatively associated with cassette 12. In addition, FIG. 1 shows, in simplified form, the major components of tape drive and control means 18 of the present invention.

While the invention is applicable to audio-visual systems having a single strip providing both audio and visual information, in the illustrated embodiment, the cassette 12 contains a separate film strip 20 for storing sequential frames of a scene and a magnetic tape 22 for storing audio information associated with a scene. The tape and film are interleaved on supply reel 24 rotatably mounted in the cassette, and traverse separate paths within the cassette before being respooled in interleaved form on takeup reel 26 which is also rotatably mounted in the cassette. Both takeup reel 26 and shuttle drive 16 are driven, in conventional fashion, by film drive motor 14 which moves film strip 20 intermittently past projection station 28. Specifically, the film strip 20 passes around an isolation idler 30, a corner idler 31, past projection lamp 32 and then around a second pair of idlers 34 before being returned to takeup reel 26.

Shuttle drive 16, driven by film drive motor 14, includes shuttle 36 having a claw that moves into and out of engagement with the film strip and laterally back and forth in the plane of the film strip as indicated by the double-ended arrow in FIG. 1. The shuttle serves to impart an intermittent motion of the film past projection station 28 so that light from lamp 32 passing through lens 38 will project onto screen 40 an image of the scene contained within a film frame while the frame is stationary between the lamp and lens.

Isolation idler 30 helps to isolate the intermittent motion of the film from the supply reel. The spring mounting of the idler 30 is extended during the time that the shuttle 36 transports a new frame into the projection station 28. As the spring relaxes, during the remainder of the frame period, it unspools a frame of film from the supply reel.

Magnetic tape 22 passes around idler 42 past transducer 48, between a capstan 44 and backup member 46, and then between idlers 49 before being respooled on takeup reel 26. Tape 22 contains (previously recorded in a camera, for example) at least two channels of information; a data channel retaining the audio information; and a reference channel containing a reference signal. In this regard, while transducer 48 provides two transducer sections or heads designated in FIGS. 3 and 4 as separate transducers 48A and 48B for the reference and audio information, respectively, it should be understood that a single audio track may be used with appropriate coding and decoding of the signals such as by multiplexing arrangements. Preferably, a reference signal of twice the highest frequency of the audio frequency e.g., 12.5 kHz is desired. Thus, a reference signal of 25 kHz is preferred. However, recording of such a high frequency requires a narrow head as well as intimate tape-to-head contact. Such stringent requirements result in both increased cost and poor reliability. Consequently, in the novel system herein described, a frequency one-quarter (6.25 kHz) of the desired frequency is actually recorded, simultaneously with the audio, and then multiplied to 25 kHz for playback control as explained in detail with regard to FIG. 4.

As explained in detail below, the tape drive and control means 18 of the present invention includes a capstan motor 50 (separate from film drive motor 14) for driving the capstan 44 which is operatively associated with tape 22 such that the tape is moved continuously past transducer 48. The output of the transducer 48 reproduces the audio information stored on the tape, and the interleaved relationship between the tape and the film is such that synchronization is achieved between the visual information projected on screen 40 and audio information on the magnetic tape. After passing across the capstan 44, the tape forms loop 52 such that the intermittent motion of the film 20 and consequent intermittent motion of take-up reel 26, is isolated from the continuous motion of the tape 22; the loop enlarging slightly when the take-up reel is stationary and contracting when the take-up reel is rotating. A loop sensing means 53 is provided to ensure the stability of the average position of loop 52, and as later explained, the control means 18 associated with the motor 50 controls the speed of the motor such that flutter in the reproduced audio signal is reduced.

Figure 3:
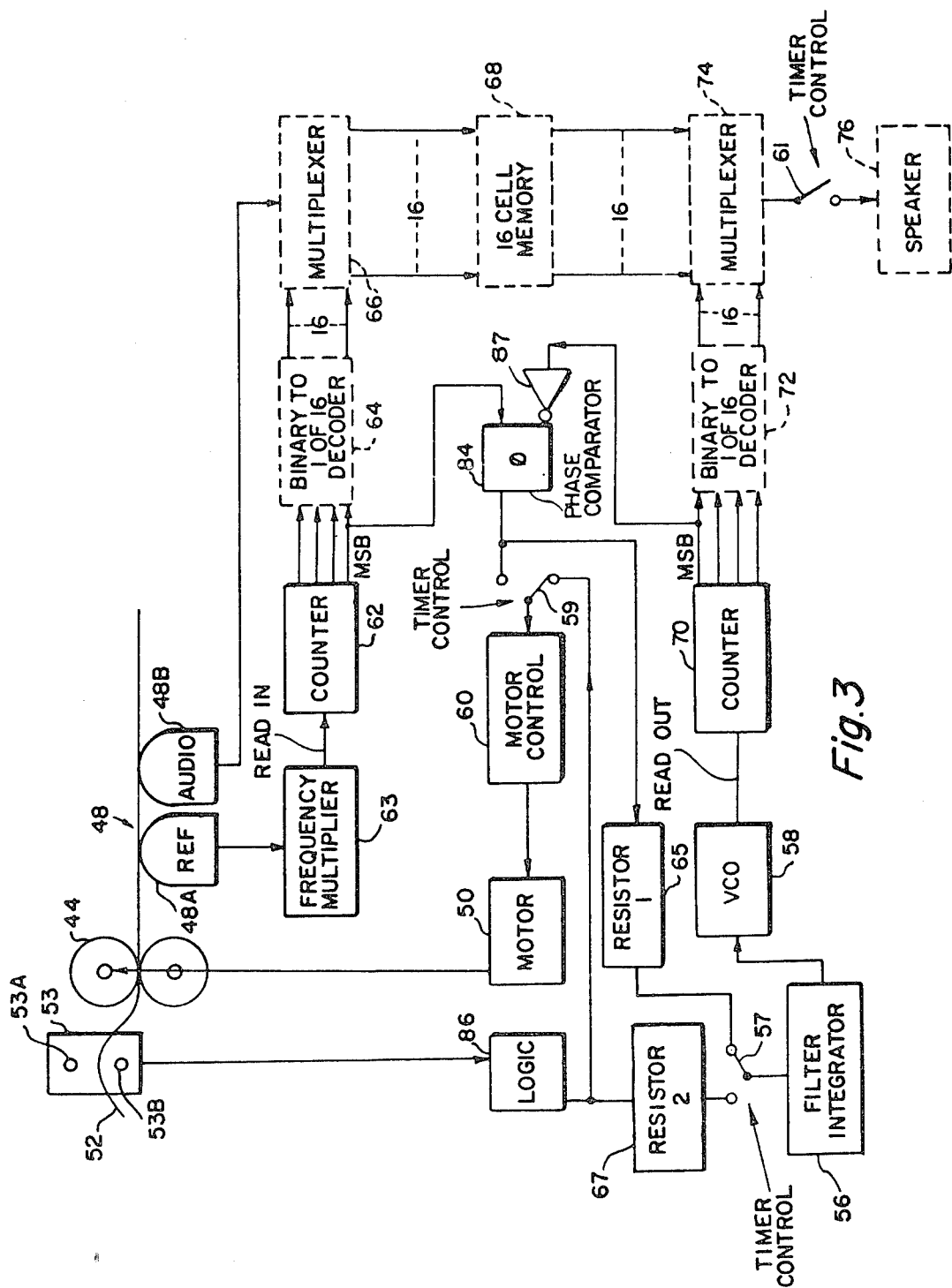

The system employs a "start-up" or transient mode initially, and then after a time sufficient to ensure that the tape loop has been formed and the drive motors are up to speed, it switches to a steady state or "run" mode. In the "start-up" mode when start switch or actuator 54 of the tape drive and control means 18 is closed, a timer-switch control 55 (which may be in the form of a one-shot multivibrator and switch arrangement) is effective to connect the components of the tape drive and control means 18 into a "start-up" configuration shown in detail in FIG. 3 for up to three seconds (during which the audio output is muted) in order to initialize the control components of the tape drive and control means. That is to say, the function of the circuit in FIG. 3 is to get the magnetic tape moving at the proper rate of speed and to create the tape loop 52. After the passage of approximately three seconds following the closing of switch 54, timer 55 switches the components into the "run" configuration shown in detail in FIG. 4. During the latter mode of operation the speaker is connected audibly to reproduce the audio information on the tape.

Figure 4:
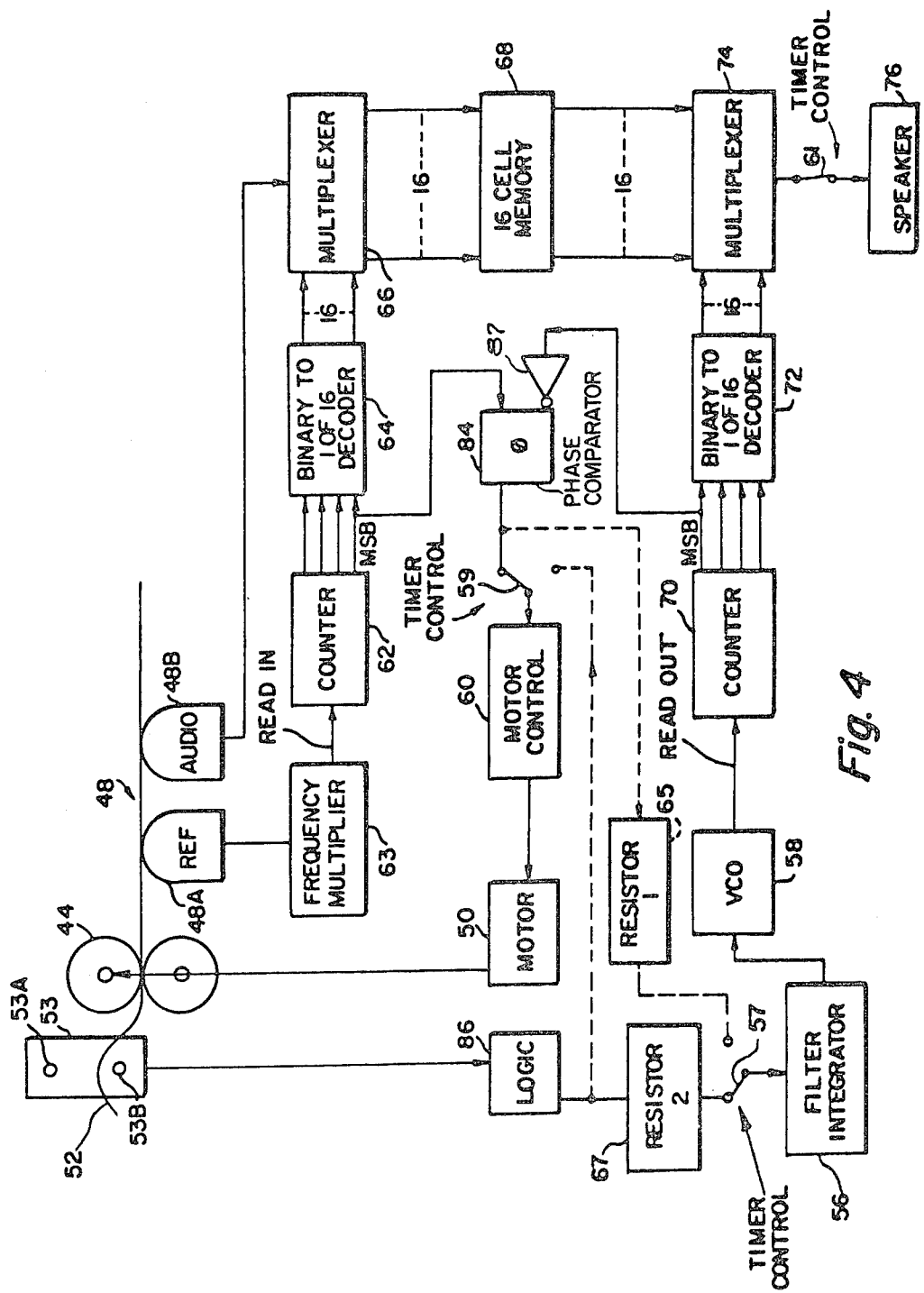
FIG. 4 is a block diagram of the tape drive and control means of the present invention showing the "run" mode configuration of the circuit in its steady state condition.

As shown in FIGS. 3 and 4, the timer 55 (FIG. 2) controls three switches 57, 59 and 61; the switch 57 controlling the input to a filter integrator 56, the switch 59 at the input to a motor control 60 and the switch 61 controls the input to an audio speaker 76. In FIG. 3, which illustrates the tape drive and control means in its start-up or transient configuration (with the unused connections and components shown dotted), the switches 57, 59 and 61 are shown in their "start-up" positions. Thus, switch 57 couples the output of a phase detector 84 through a resistor 65 to a filter integrator 56, as later explained in detail, to set the initial "run" frequency of the circuit. At the same time, the switch 59 couples the output of the logic circuit 86 to the motor control network 60 such that the latter is thereby under the control of the loop sensor 53 to create a loop 52 which is, in turn, sensed by the loop sensor 53.

Sensor 53 is illustrated for clarity as having two photodetector circuits 53A and 53B whose physical locations establish the maximum and minimum limits of loop 52. That is to say, when the loop is between the two photosensors 53A, 53B, the motor speed is unchanged. When motor 50 is running too slow to maintain loop 52 within the prescribed limits, photosensor 53B will cause control 60 to speed up the motor thereby recreating the loop. On the other hand, when motor 50 is too fast, the loop will tend to become too large, and photosensor 53A will then be effective to cause control 60 to slow down the motor. Eventually, and within a very short time, say within three seconds, a loop of the correct size is established by motor 50. During this initial start-up period, the output of the audio transducer 48B is also muted by means of the now open switch 61.

As indicated above, during the "start-up" configuration, the initial "run" frequency of the circuit is also determined. This is accomplished by means of the phase detector 84 which compares the most significant bit of a counter 62 and counter 70; the most significant bit of the latter being fed through an inverter 87 to the phase detector 84. The input to the counter 62 is the multiplied reference signal, 25 kHz, derived by means of a frequency multiplier 63 (FIG. 6) from the 6.25 kHz tone from head 48A. On the other hand, the input to counter 70 is the output frequency of a voltage controlled oscillator 58 which frequency, in turn, is determined by the filter integrator 56.

The filter integrator 56 essentially provides an averaging of its input signal and since, in the "start-up" configuration, the switch 57 couples the phase detector output to the filter integrator 56, the latter rapidly drives the oscillator 58 up to a frequency synchronized with the multiplied reference signal. Stated otherwise, the detector 84 keeps changing the voltage of the oscillator 58 until the most significant bits of the counters 62 and 70 reach the same frequency.

To produce a rapid averaging or integration during "start-up", a relatively small resistor 65 is switched into the integrator at this time. This resistor provides a relatively rapid variation in the integration. For the "run" mode, this resistor is replaced by a relatively larger resistor 67 to produce a slower response.

Figure 2:
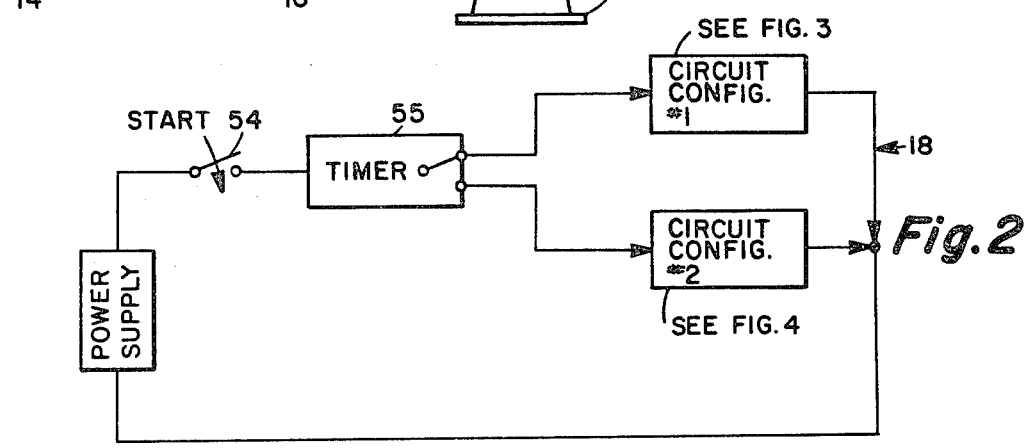
FIG. 2 is a block diagram of a tape drive and control means of the present invention showing a timer for selecting a "start-up" or "run" mode circuit configuration.

The logic unit 86 is directly connected to both one side of the switch 59 and to the resistor 67. In the startup configuration (FIG. 3), the logic unit 86 is connected to the motor control 60 by virtue of the switch 59 while the circuit through the resistor 67 remains open in accordance with the "startup" state of the switch 57. Once the timer alters the switches to their "run" state as shown in FIG. 4, the logic unit 86, instead of being directly connected to the motor control 60 is now connected through resistor 67 and switch 57 to filter integrator 56. Thus, as schematically illustrated in FIG. 2 and explained in more detail below, the system includes two circuit configurations; one shown in solid lines in FIG. 3 and the other shown in solid lines in FIG. 4.

After a predetermined time, during which the loop 52 and the run frequency become properly established, the timer 55 alters the switches 57, 59 and 61 to switch the components to the "run" configuration as shown in FIG. 4. As shown in FIG. 4, the output of the loop logic unit 86 is now coupled through resistor 67 by switch 57 to a chain of circuits including filter integrator 56, voltage controlled oscillator 58, counter 70, inverter 87 and phase detector 84. The output of the phase detector 84 is switched to the motor control 60 and the speaker switch 61 is closed, all as a result of the switching of timer 55.

With regard to the "run" mode of operation which will now be described, the counter 62 is a 0-15 counter which counts from 0 to 15 and then repeats itself responsive to an input of a continuous train of pulses, that is, the multiplied reference signal. The output of counter 62 is decoded at 64 for the purpose of controlling a multiplexer 66 which receives and samples the output of the audio channel from the transducer 48B at a frequency determined by the multiplied frequency of the output of transducer 48A. In addition, multiplexer 66 also routes the samples to individual cells of a 16-cell memory 68. That is to say, multiplexer 66, under the control of the decoder 64, is effective to successively read in representations of the samples of the audio signal into respective cells of the memory 68. After counter 62 has completed a cycle, the next 16 samples of the auido are input into the memory 68, thereby replacing the contents in the individual cells of the memory.

At the same time, oscillator 58 because of the previous action of the "start-up" mode, is initially producing a train of pulses at the same average frequency as the multiplied output of transducer 48A. The output of oscillator 58 is connected to the input of counter 70, which is similar to counter 62 and the latter, in turn, is connected to decoder 72 which is similar to decoder 64. The output of decoder 72 is applied to a multiplexer 74 which serves to successively read out the respective cells of memory 68 at the same average rate that samples are being read into the memory by decoder 64. The output of multiplexer 74 is delivered through the switch 61 to the audio speaker 76 for converting the sampled signals into analog form and permitting the sound information on the audio channel to be reproduced.

As explained in detail below, a delay is provided between the time a particular sample is read into memory 68 and the time when the same sample is read out of the memory. This delay is automatically varied in accordance with variations in tape speed while the rate at which samples are read out of memory 68 remains substantially constant in view of the output of oscillator 58 which has been determined as described above during the start-up process. In this manner, short duration, large accelerations of tape 22 past the transducer 48 will have no effect on the signal being applied to speaker 76.

The delay is provided by means of the phase detector 84 and the inverter 87, which provides an error signal to the phase detector, whenever the most significant bit (MSB) of the counters 62 and 70 become the same. Now, since the most significant bit of each counter changes every eight consecutive counts, the difference between the address of the cell being read out and the address of the cell being read into tends to average around eight. In other words, if tape 22 speeds up or slows down such that the frequency of the read-in pulses applied to counter 62 changes with respect to the frequency of the read-out pulses applied to counter 70, the inputs to phase detector 84 will change, thereby causing the phase detector 84 to produce an error signal for control 60 which has the effect of changing the motor speed to reduce the error signal. While such increases or decreases in the tape speed are occurring, the voltage input to the oscillator 58 will remain substantially constant over the short run because of the integrator 56 such that the rate at which samples are read out of memory 68 will also remain substantially constant over the short run and independent of fluctuations in speed of tape 22.

From the foregoing, it can be seen that a first portion of the control circuit, comprising counters 62, 70; decoders 64, 72; multiplexers 66, 74; memory 68 and phase detector 84, is concerned with reducing flutter in the reproduced audio signal output from the speaker 76. A second portion of the control circuit, described below, is concerned with maintaining the tape loop 52 in the presence of changes in the speed of film drive motor 14 (FIG. 1). The second portion includes the sensor 53 and the logic circuit 86 which senses when loop 52 exceeds or is less than the predetermined loop size as established by photosensors 53A and 53B. Now if the film motor decreases its speed relative to the tape drive motor, the tape loop increases beyond its predetermined size. Sensor 53A detects the presence of the tape and the logic 86 responds by means of the integrator 56 to change the voltage on control oscillator 58 such that the oscillator frequency increases to thereby raise the frequency of the most significant bit of the counter 70. In turn, the phase detector produces an error signal inputed to the motor control 60 so as to reduce the speed of motor 50. On the other hand, when the film drive motor increases its speed relative to the capstan drive motor, the tape loop is decreased and the sensor 53B causes logic unit 86 to produce a signal that causes oscillator 58 to decrease its frequency such that the error signal produced by phase comparator 84 will speed up the tape drive motor to thus maintain the loop size. Thus, the second portion of the control circuit is effective to cause the independently operating capstan drive motor 50 to track speed changes in the film drive motor 14.

Since the oscillator 58, which determines the read-out rate, is controlled by the logic unit 86 and the integrator 56, it can be understood that these circuits provide means responsive to the output of the loop sensor for determining the output rate. Further, the phase detector 84, the inverter 87 and the input from the counters 62 and 70, as well as the motor control 60, provide means for controlling the capstan motor to drive it at a speed which maintains the size of the tape loop.

Figure 5:
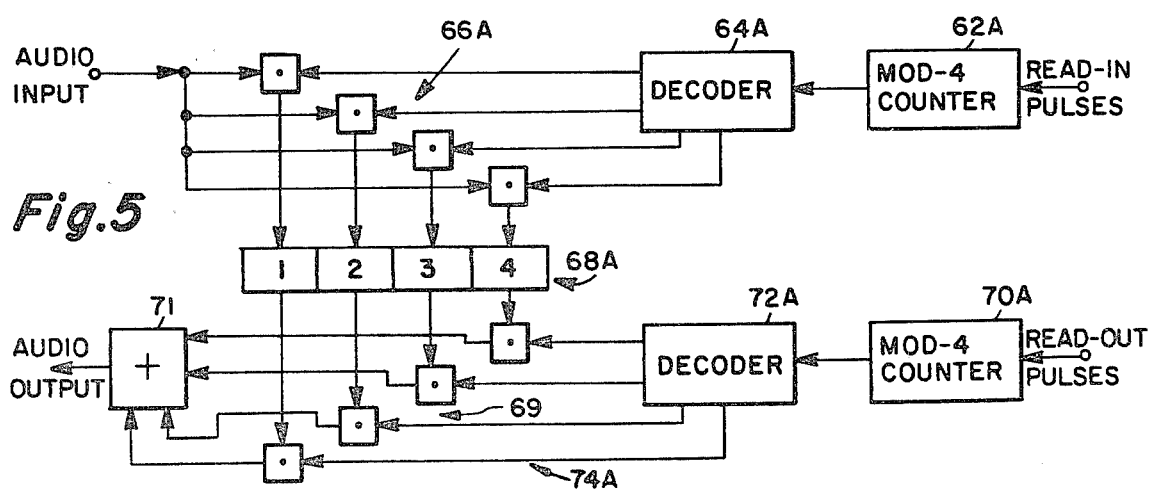
FIG. 5 is a block diagram showing a simplified multiplexer and memory for illustrating the principle of operation of the present invention.

To illustrate how the first portion of the control circuit maintains the constant read-out rate of the signals in the memory, a simplified version of the multiplexers and memory shown in FIG. 4 is illustrated in FIG. 5. Specifically, FIG. 5 shows a 4-cell memory 68A which is merely illustrative of the 16-cell memory 68 shown in FIG. 4. It should be understood that the size of the memory is not material and that any size memory would be appropriate, bearing in mind that the larger the memory, the greater is the displacement between the address of the cell currently being read into as compared to the address of the cell currently being read from. The greater the difference in addresses between the read-in and read-out cells, the greater will be the ability of the control system to compensate for long duration changes in speed of the tape. Thus, the 16-cell memory shown in FIG. 4 is selected only for purposes of illustration.

In FIG. 5, the basic flutter control system (described in the prior art patents noted on page 2 of the specification) is illustrated for clarity in a highly simplified manner. In this illustration, it should be understood that the input is undergoing flutter, so that the read-in pulses occur irregularly in time.

Referring now to FIG. 5, read-in pulses applied to a mod-4 counter 62A cause the counter to produce an output which is decoded by a decoder 64A into sequential strobing of gates 66A to which an audio input is also applied. As a consequence of this arrangement, samples of the audio input are sequentially stored in the four cells of memory 68A. That is to say, the first sample is stored at address 1, the second sample at address 2, etc. The fifth sample is stored in address 1, etc.

Read-out pulses applied to a mod-4 counter 70A cause this counter to produce an output which is decoded by decoder 72A which strobes gates 69 and sequentially transfers the contents of the cells in memory 68A to an output buffer 71 from which a reproduction of the audio input can be obtained. It should be noted that the cells of memory 68A are read out sequentially in the same manner that these cells have samples read thereinto.

Figure 6:
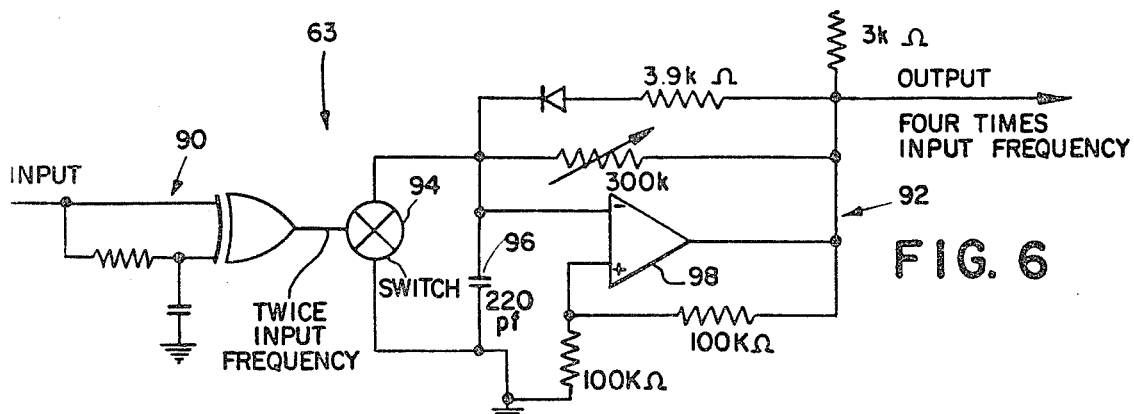
FIG. 6 is a diagram of a frequency multiplier employed in the preferred embodiment.
Figure 7:
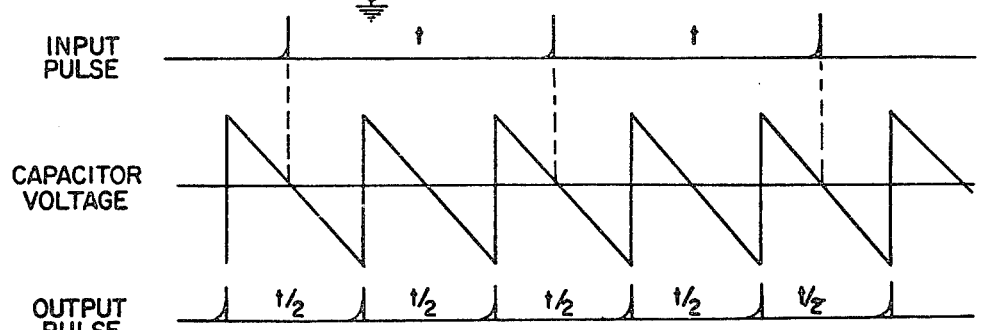
FIGS. 7, 8 and 9 are graphs illustrating the operation of the multiplier of FIG. 6.
Figure 8:
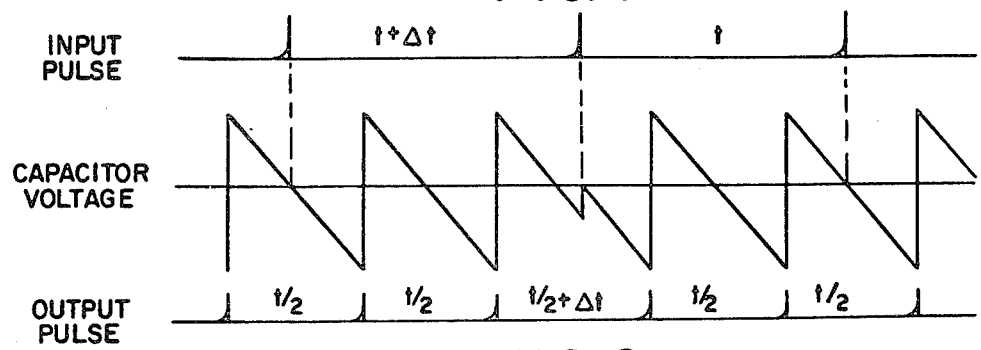
Figure 9:
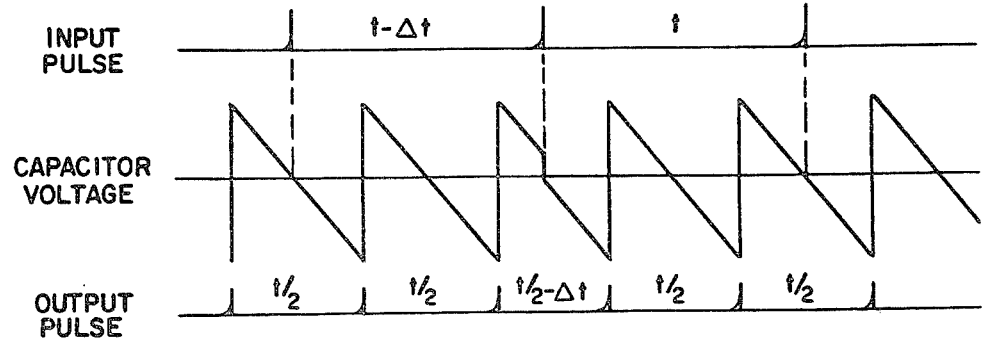

The multiplier 63 is shown in more detail in FIG. 6 and includes in effect a conventional zero-crossing multiplier 90, which doubles the tape frequency, controlling a conventional synchronized oscillator 92 by means of a normally open switch 94. The oscillator 92 comprises a comparator 98 having a 220 pf capacitor 96 connected from its inverting input to ground. The capacitor 96 is rapidly charged by means of a comparator 98 through a small resistor of 3.9 k$\Omega$ and slowly discharged through a large adjustable resistor of 300 k$\Omega$ such that a saw-tooth oscillation is created across the capacitor as shown in FIGS. 7–9 so long as the switch 94 remains open. The latter is a conventional electronic switch designed to close and short the capacitor each time a pulse is received from the zero-crossing multiplier 90. Hence, the capacitor 96 provides a charge storage device periodically charged and discharged to provide an oscillatory waveform and the switch 94 provides switching means operable for selectively driving the storage device to zero so as to synchronize the oscillator with the operation of the switching means.

The 300 k$\Omega$ resistor is adjusted to drive the oscillator 92 at the desired frequency of 25 kHz. Then, if the pulse derived from the zero-crossing multiplier 90 occurs precisely at the zero-crossing of the capacitor 96 as shown in FIG. 7, the oscillator frequency remains unchanged. A narrow pulse is provided from the zero-crossing multiplier such that the switch is closed for a very short time as compared to the capacitor discharge rate. Since the input pulses are expected at 12.5 kHz (twice the tape frequency), they occur with a period designated "t" while the oscillation period is t/2. Hence, the controlled switching affects every other cycle of the oscillator 92.

If the tape frequency begins to lag the oscillator frequency, a switching pulse occurs at t+Δt and the capacitor having discharged below the zero-crossing is shorted or returned to the zero-crossing as shown in FIG. 8. This action delays the oscillator so as to resynchronize it with the tape frequency. On the other hand, if the tape frequency shifts to lead the oscillator frequency so that a switching period becomes 6−Δt, the capacitor is shorted early and driven at an early stage to the zero-crossing. This, in turn, makes the oscillator pulse occur earlier. In this manner, the oscillator 92 is continually resynchronized to follow the tape frequency.

It is believed that the advantages and improved results furnished by the apparatus of the present invention are apparent from the foregoing description of the several embodiments of the invention. Various changes and modifications may be made without departing from the spirit and scope of the invention so sought to be defined in the claims that follow.

What is claimed is:

1. An oscillator circuit comprising:
    an oscillator unit employing a charge storage device, said unit being energizable for periodically charging and discharging said storage device to produce a selected frequency at the output of said oscillator unit;
    switching means operable for discharging said charge storage device; and
    means comprising a zero-crossing multiplier driven by a given input frequency for actuating said switching means in relation to the input frequency so as to discharge said storage device at each zero-crossing of the multiplier, and thereby continually resynchronize the output of said oscillator unit with respect to said given frequency.

2. A synchronizable oscillator circuit comprising an oscillator unit having a charge storage device automatically periodically charged and discharged for producing an oscillatory output waveform from said unit, and switching means actuatable for selectively discharging said charge storage device so as to synchronize said output waveform of said oscillator unit in accordance with the actuation of said switching means, said oscillator unit comprising a comparator having a capacitor connected from its inverting input to ground, and said switching means being a normally open switch connected across said capacitor, said circuit further including means for operating said switching means at a given rate approximately one-half that of said oscillator unit whereby said oscillator unit produces an output having a frequency twice that of said given rate, but continuously resynchronized with said given rate, and said means for operating said switching means is a zero-crossing multiplier driven by a given input frequency.

* * * * *